Jan. 2, 1962 W. P. VOTH 3,015,130
RETREADING EQUIPMENT
Filed Sept. 29, 1959 2 Sheets-Sheet 2

INVENTOR
WALTER P. VOTH

BY Jordon C. Caack

ATTORNEY

3,015,130
RETREADING EQUIPMENT
Walter P. Voth, Akron, Ohio, assignor to The Akron Standard Mold Company, Akron, Ohio, a corporation of Ohio
Filed Sept. 29, 1959, Ser. No. 843,115
1 Claim. (Cl. 18—18)

This invention relates to equipment for retreading tires.

More particularly, the invention relates to a press to be used with a retreading mold which is supported by a dolly. The mold is brought to the press on the dolly and there it is opened to place a tire in it or remove a tire from it, and then the mold is removed from the press on the dolly.

In the dollies used in such an operation, the mold has been spring supported so that when the dolly is moved to the press in order to position the mold over the lower platen, the mold clears the tops of any centering devices, etc. on this platen. Then by applying pressure to the mold or to some portion of the dolly, the mold is lowered into position on the platen. In the dolly to which this invention relates there are no supporting springs in the dolly, but the dolly rests on a spring-supported platform located at the press where the mold is opened and closed. By eliminating the springs from the dolly and supporting the dolly itself on springs, a considerable saving is effected, because a number of dollies are used with a single press. The number used is dependent upon the length of the curing cycle. During a single curing cycle, a number of molds are opened and closed in the press, and each mold is carried by a separate dolly, as an integral part of the dolly. By providing only one spring means at the press instead of having separate spring means in each dolly, a substantial saving results because the spring means are expensive, and only one spring installation is required instead of providing a separate spring installation in each of the several dollies.

There is nothing novel about the press operation, and there are various types of presses that can be used. The press not only includes means for raising and lowering the upper half of the tire mold, but also includes means for pressing the dolly-supported lower half of the tire mold on to the lower platen and holding it there while the mold is opened and closed. The pressure for forcing the lower half of the mold to the supporting means may be applied to the upper half of the closed mold, or it may be supplied to some portion of the dolly.

In the accompanying drawings the pressure for lowering the bottom half of the mold into contact with the support is applied to the dolly, but this is illustrative only. The press, the dolly, the means for centering the dolly with respect to the press, etc. are merely illustrative of the type of equipment that can be used.

In the drawings—

Figure 1:
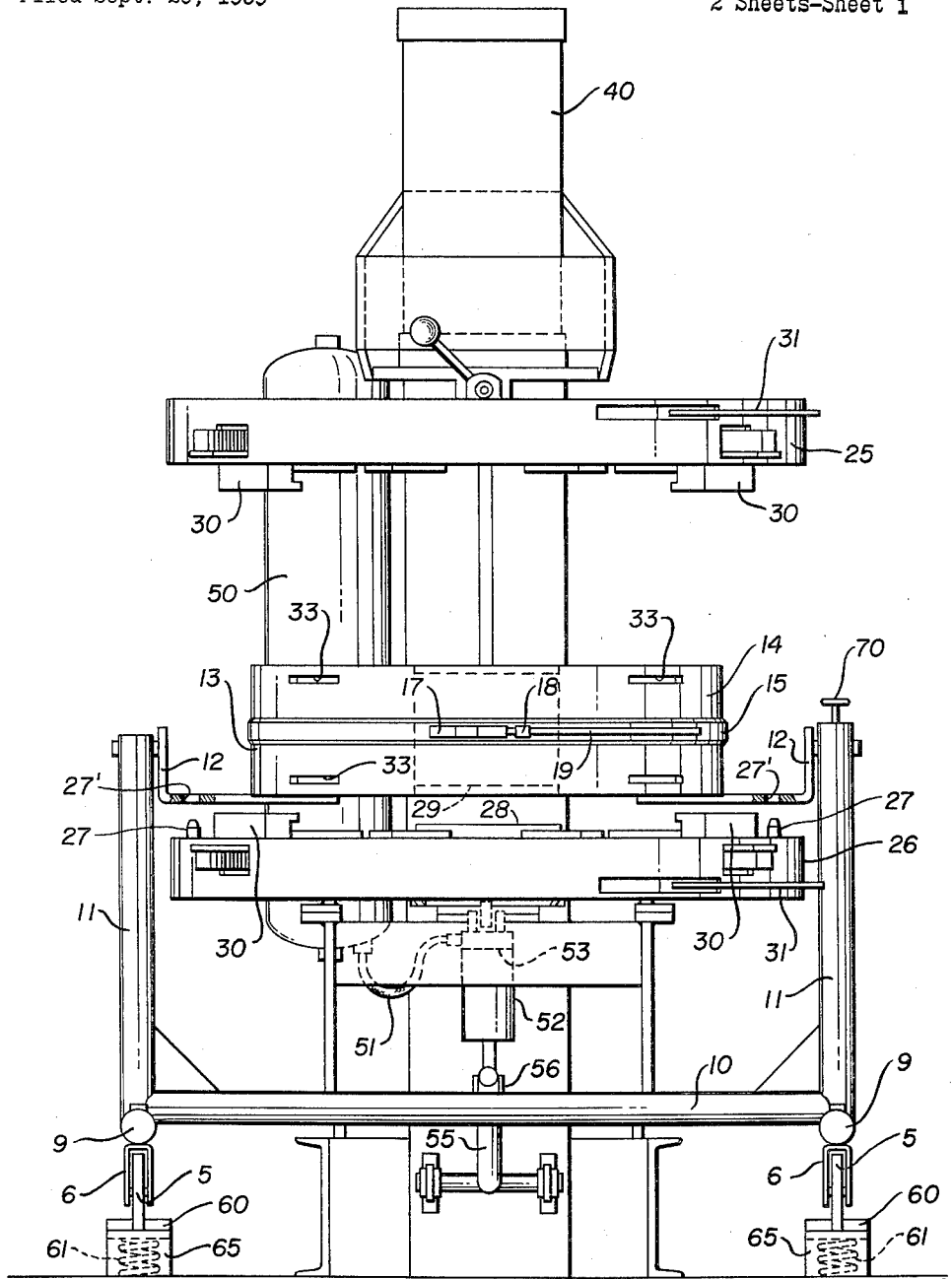
FIG. 1 is a front view of the press with the dolly in place.

In the drawings, the dolly is supported on the four wheels 5. The yokes 6 in which the wheels are supported are adapted to be pivoted to any angle. The base frame of the dolly includes the two side members 9 and the cross bar 10. The uprights 11 are provided with brackets 12 which support the lower half 13 of the mold. The upper half 14 is fastened to the lower half by the removable band 15. There are engageable means 17 at the two ends of the band, the handle 19 being pivoted in the means 18 in the band and connected with one portion of the engaging means which is interlocked with the other portion. By moving the outer end of the handle away from the band, the means 17 become disengaged and the band is thus separated from the two halves of the mold. When the band is separated the upper half 14 of the mold can be lifted from the lower half 13.

Applicant claims nothing novel about the press design or its operation, except the spring-supported platform which will be discussed. The press includes the upper platen 25 and the lower platen 26. The mold is centered in the press by the dowel pins 27 which enter openings 27' in the brackets 12 and by the centering ring 28 which fits into the depression 29 in the bottom of the mold. Both platens include mold-engaging means 30, movable to and from the mold by movement of the handles 31, a usual type of mold-engaging mechanism. The mold-engaging means operate in and out of the slots 33 in the upper and lower halves of the mold.

The upper platen 25 is raised and lowered on the frame 40 by any usual means operated electrically or hydraulically, etc.

The cylinder 50 contains air under pressure. It is connected by the pipe 51 to the cylinder 52. When air is admitted into the cylinder it lowers the piston 53 and this applies pressure through the piston rod 54 to the pressure bar 55 which is attached to the piston rod 54 by the clevis 56.

Figure 2:
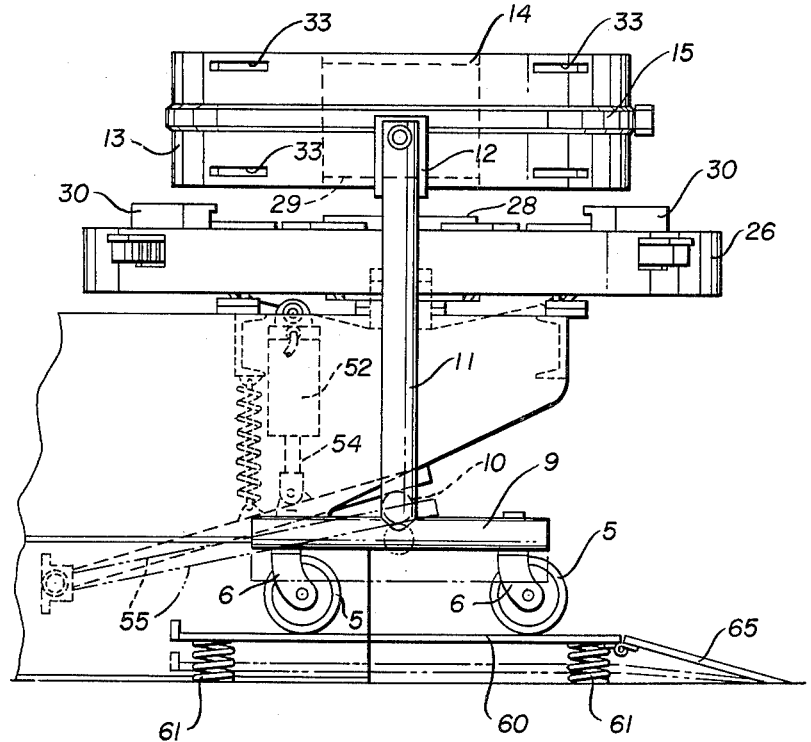
FIG. 2 is a side view of the lower part of the same showing only the dolly and mold and the lower part of the press.

In operating the mechanism, the dolly carrying both halves of the mold, is rolled on to the run-ways 60 which are supported by the springs 61. Together, these runways constitute a platform. The platform supports the mold at such a height that as the dolly is rolled into position the mold clears the tops of the dowel pins 27, the mold-engaging means 30, and whatever else may project above the level of the top of the bottom platen. When the mold is in position, pressure is applied by the pressure arm 55 to the cross bar 10 until the mold is seated on the platen, with the dowel pins 27 engaged in the openings in the brackets 12. (The position of the pressure bar, springs and dolly, when pressure is applied, is shown in FIGURE 2 in dot-dash lines.) The engaging means 30 of the lower platen are then actuated by the arm 31 on the lower platen so that the position of the lower half of the mold becomes fixed on this platen against the pressure of the springs 61. The upper platen is then lowered into contact with the upper half of the mold, the band 15 is removed, and the engaging means 30 of the upper platen are engaged in the slots 33 of the upper half of the mold. The upper platen is then raised with the upper half of the mold attached to it. A tire to be retreaded is then inserted in the lower half of the mold and an air bag is placed in the tire. The upper platen is then lowered and the mold is closed. The band 15 is replaced and the engaging means 30 of the upper and lower platens are removed from the slots 33. The upper platen is again raised, and as it is raised the springs 61 lift the dolly and the mold out of contact with the lower platen because the means 30 are disengaged from the mold. The dolly is then rolled off the platform 60, down the ramp 65 to a station where the tire is vulcanized.

The mold halves are advantageously equipped with electrical heating means for curing the tire. When the tire has been cured the dolly is rolled back on to the platform 60, and the pressure bar 55 presses on the dolly to bring the mold into contact with the lower platen against the pressure of the springs 61. The engaging means 30 of both platens are engaged in the slots 33, the band 15 is removed, the mold is opened as before, and the retreaded tire is removed from the mold.

When rolling the dolly to and from the press, the mold is preferably held in a vertical plane. It is held in this position by tightening the setscrew 70 (FIG. 1). Any usual locating means other than the dowel pins 27 and ring 28 can be provided to insure placement of the lower mold in exactly the correct position on the lower platen for engagement of the engaging means 30 in the slots 33.

The equipment shown in the drawings is illustrative. Other equipment may be utilized in carrying out the invention.

The invention is covered in the claim which follows.

What I claim is:

In the combination of (1) a press for opening and closing a mold for retreading tires and (2) a dolly supporting the mold, which press includes a lower platen on which the mold is adapted to be supported, with coacting registering means on the press and dolly for registering the lower half of the mold with the mold-engaging means on the lower platen, and a pressure member on the dolly below the lower platen the improvement which comprises a spring-supported platform on which the dolly stands when the mold is above the lower platen and means in the press adapted to press down on the pressure member while the dolly is on said platform.

References Cited in the file of this patent

UNITED STATES PATENTS

| | | |
|---|---|---|
| 1,738,326 | Smith | Dec. 3, 1929 |
| 2,543,292 | Kany | Feb. 27, 1951 |
| 2,622,275 | Dodge | Dec. 23, 1952 |
| 2,903,742 | Barefoot | Sept. 15, 1959 |

FOREIGN PATENTS

| | | |
|---|---|---|
| 739,824 | Germany | Aug. 19, 1943 |